United States Patent Office 3,804,818
Patented Apr. 16, 1974

3,804,818
PROCESS FOR RECOVERY OF ROSIN AND FATTY ACID FROM ALKALINE BLACK LIQUOR
Paul D. Patrick, Jr., and Brantley D. Thomas, Jr., Charleston, S.C., assignors to Westvaco Corporation, New York, N.Y.
No Drawing. Continuation-in-part of abandoned application Ser. No. 143,617, May 14, 1971. This application Sept. 12, 1972, Ser. No. 288,458
Int. Cl. C09f 8/07
U.S. Cl. 260—97.5          12 Claims

ABSTRACT OF THE DISCLOSURE

The intimate mixing with a sufficient amount, e.g., a trace to 0.025% by weight, of a high molecular weight, water-soluble cationic polymer has been found to increase the rate of separation of crude tall oil from the brine and lignin of alkaline black liquor soap skimmings, as well as decrease the pitch yield, thereby increasing the yield of rosin and fatty acids.

Cross Reference to Related Application

This application is a continuation-in-part of co-pending application Ser. No. 143,617, filed May 14, 1971 and now abandoned.

BACKGROUND OF THE INVENTION (1) Field of the invention

This invention relates to processing tall oil. More particularly, this invention relates to a process for recovering rosin and fatty acids from tall oil by lowering the pitch yield of crude tall oil.

(2) The prior art

The residual liquor from the alkaline processes of wood pulping, i.e., the kraft and soda processes, is known as "black liquor." Black liquor, in addition to containing the residual chemicals used for pulping, also contains valuable organic by-products from the pulped wood. These organic by-products are primarily lignin and tall oil in a salt form.

Tall oil is recovered from black liquor by concentrating the solids present in the black liquor usually through evaporation to about 25–35% solids content and allowing the black liquor to settle. Upon settling a material, which is lighter than water, containing the tall oil rises to the top and is skimmed off. This material is known as "soap skimmings" and contains about 60% solids. The tall oil, present in the soap skimmings as sodium salts, is acidified with sulfuric acid to liberate the "crude tall oil," which is decanted off. The yield of crude tall oil is about 50 to 56% of the soap skimmings. In order to obtain all of the tall oil present, considerable amounts of lignin, mixed in the tall oil and at the interface, are decanted with the crude tall oil and end up as pitch. Due to esterification and entrainment, the lignins carry fatty acids into pitch, increasing the pitch yield further and consequently reducing valuable fatty acids and rosin acids. Crude tall oil is a black, viscous, stickly liquid and although it has found applications in its own right, it is preferable to separate crude tall oil into its more valuable rosin and fatty acid components.

The conventional method of separating the components of crude tall oil is by fractional distillation. The first step in fractionation is to separate the volatile fraction of tall oil from the nonvolatile or pitch fraction. The pitch fraction varies from 16 to 24%, usually about 20–22%, of the crude tall oil depending upon the source and care during processing. It is therefore desirable to decrease the yield of pitch thereby increasing the yield of the more valuable constituents of crude tall oil.

It is therefore the general object of this invention to provide a process for recovering the valuable constituents from black liquor. A more specific object is to provide a process for improving the yield of fatty acids and rosin acids in crude tall oil. Another object of this invention is to provide a process for reducing the amount of pitch obtained during fractional distillation of crude tall oil. Still another object of this invention is to provide a process for increasing the rate of separation of the crude tall oil fraction from the brine and lignin fractions.

Other objects, features and advantages of this invention are apparent from the following description.

SUMMARY OF THE INVENTION

It has been found that the objects of this invention may be accomplished by the addition with simple mixing to black liquor soap skimmings, either before or after acidification, of a high molecular weight, water-soluble cationic polymer having a positive charge greater than +10 on the SCD scale in an amount from a trace to 0.025% by weight, preferably about 0.001% to 0.01% by weight.

DETAILED DESCRIPTION OF THE INVENTION

The black liquor soap skimmings, recovered from the kraft process at about 50–65% solids content, are reacted with sulfuric acid to convert the sodium soaps into free rosin and fatty acids. The reaction mixture is then allowed to settle. The organic acids making up the crude tall oil separate from the sodium sulfate solution formed during the acidification and from the lignin and other impurities. The sodium sulfate is returned to the alkali recovery liquors of the paper mill. The tall oil is washed with hot water and allowed to settle. The crude tall oil is drawn off and placed in storage. The yield of crude tall oil varies somewhat, depending on the source of the wood and the details of its processing, but generally yields about 50 to 56% of crude tall oil.

Settling allows the crude tall oil to separate from the brine and lignin. In order to obtain the crude tall oil present, considerable amounts of lignin, mixed in the oil and at the interface, are carried over with the crude tall oil and upon distillation end up as a pitch. A second factor limiting yield is due to esterification and entrainment, by which the lignins carry fatty acids into pitch, increasing the pitch yield further.

According to this invention, a high molecular weight, water soluble cationic polymer having a positive charge greater than +10 on the SCD scale is added either to the black liquor soap skimmings prior to acidulation, during acidulation, or the crude tall oil after separation and before settling.

The cationic polymer is added in trace amounts up to 0.025% by weight, preferably 0.001% to 0.01%. As the level of polymer is increased above 0.025% separation of crude tall oil from the lignin and brine, in many instances, is actually impaired. The cationic polymer has a favorable impact on the separation immediately upon addition, therefore only trace quantities are necessary to get some improvement. Usually though at least 0.001% by weight is added to get a commercially significant improvement with the rate of improvement increasing up to about 0.0025% by weight. Since the soap skimmings are acidified in large tanks, e.g., 10,000 gallons or bigger, it is easy to see that the addition of, for example, 0.0025% by weight, or about one quart of the cationic polymer may be difficult from a mixing aspect. Therefore the cationic polymer is generally added as a 0.1% to 40.0% or higher, preferably about 0.5%, solution to either the soap skimmings or the crude tall oil. Good contact of the cationic polymer is all that is necessary to accomplish the process of the invention. Thus only simple mixing need be used. The results obtained from using the process of this invention do not appear to be effected by temperature, therefore the process is normally carried out at ambient temperature but heat may be used up to about 100° F. The addition of the cationic polymer increases the rate of settling of crude tall oil and decreases the amount of pitch thereby increasing the amounts of valuable rosin and fatty acids.

Suitable cationic compounds are water-soluble polyamine and polyamides that are characterized by high positive charges when measured in the cell of a Streaming Current Detector (SCD), such as that produced by Waters Associates. By high positive charge, it is meant that an initial polymer solution has a charge of greater than +10 on the SCD scale. In general, the more highly cationic the polymer (i.e., the more amino groups which each polymeric macromolecule contains), the more effective.

More specifically, the high molecular weight, water-soluble cationic polymers suitable for use in the process of this include, (1) polyamide resins, (2) lignin amines, and (3) polyacrylamides modified with monomers having a tetraalkyl ammonium group. Cationic polymers having a molecular weight in excess of 1000 are preferred because, in general, they are more effective per unit weight. Moreover, it is preferred that the polymer contain at least one amino group (primary, secondary, tertiary or quaternary ammonium) for every 10 carbon atoms therein, so that the polymer possesses strong cationic properties.

The polyamide resins contemplated for use in this invention are liquid reactive fatty polyamides with high amino functionality condensed with epichlorohydrin. The fatty amides are made by reacting a dibasic acid such as adipic, sebacic, terephthalic or fumaric, with a poly-alkylene-polyamine such as diethylene triamine, triethylene tetramine, hexamethylene diamine and tetraethylene pentamine. The molecular weight of these materials is generally between 3,000 and 5,000 but it is not necessarily limited thereto. The most efficient of the polyamide resins are those water-soluble polyamides produced from adipic acid and diethylene triamine, and/or triethylene tetramine and/or tetraethylene pentamine, and condensed with epichlorohydrin. These products are generally recognized as very efficient retention aids in the paper industry and reference may be had for instance to U.S. Pat. 3,409,500 to Strazdins et al. The polymers contain 13–16% nitrogen on a dry basis although are usually found as solutions in water and have minimum viscosities of 75 cps. at 25° C.

The most efficient cationic polymer represented by the lignin amine group are those lignin amines prepared via the Mannich reaction of lignin, formaldehyde and dimethylamine. Other suitable lignin amines include, for example, lignin amines produced by the reaction of lignin with epichlorohydrin and a di- or tri-amine such as dimethylamine, trimethylamine, diethanolamine or triethanolamine as disclosed in co-pending patent application Ser. No. 134,856 filed Apr. 16, 1971 and now abandoned.

Of the polyacrylamides modified with tetra-alkyl ammonium group containing monomers, the preferred are polycationic products, such as those obtained by homo- or copolymerization of 2-(dimethylamino)ethyl acrylate, can, of course, be neutralized with inorganic, organic, and polymeric acids, such as sulfuric, acetic, and polyacrylic, in addition to the usual saponification for polymeric acrylates. These polymeric tertiary amines can also be quaternized with reagents such as methyl hydrogen sulfate to form the corresponding quaternary ammonium derivatives.

Using the process of this invention, plant results bear out the above assumptions and pitch yield may be reduced 2% or more, thereby increasing the amount of available rosin acids and fatty acids. The significance of this effect is amplified by the fact that an increased value of about 1.5% per ton of crude feed can be obtained for each 1% reduction in pitch yield.

The practice of this invention may clearly be seen in the following examples.

EXAMPLE 1

The effect of settling rate on black liquor soap skimming is illustrated in this example. To concentrated black liquor soap skimming at 58% solids content was added at 0.0025% and 0.025% by weight additive solids to soap skimmings of a 0.5% solution of a high molecular weight cationic polyamide resin produced from adipic acid and diethylene triamine and condensed with epichlorohydrin. The polyamide resin had a positive charge of +60 on the SCD scale. The mixture was acidified with 66° Baumé (95%) sulfuric acid at a 1:5 ratio of acid to soap solids. The rate of separation of the crude tall oil, lignin and brine layers was observed in a 500 ml. graduate cylinder at a constant temperature of 85° C. The speed of settling and demarcation between layers was noted. This was compared to settling with no additive.

| Acidified soap skimmings | Percent in fraction after— | | | | | |
|---|---|---|---|---|---|---|
| | 15 min. | 30 min. | 45 min. | 60 min. | 90 min. | 120 min. |
| Without additive: | | | | | | |
| Lignin fraction | 25 | 25 | 25.0 | 21.5 | 21.5 | 20.0 |
| Crude tall oil fraction | 5 | 5 | 9.5 | 10.5 | 10.5 | 12.0 |
| With additive at 0.0025%: | | | | | | |
| Lignin fraction | 13.0 | 7.5 | 7.0 | 7.0 | 5.0 | 5.0 |
| Crude tall oil fraction | 23.0 | 28.5 | 29.0 | 29.0 | 31.0 | 31.0 |
| With additive at 0.025%: | | | | | | |
| Lignin fraction | 56 | 36.5 | 35.6 | 32.2 | 31.0 | |
| Crude tall oil fraction | 1.5 | 7.5 | 9.0 | 10.5 | 12.0 | |

The remainder of each solution formed the brine layer. The results show that after 15 minutes of settling without the additive the crude tall oil layer was 5% of the total; whereas with the additive the crude tall oil layer was 23%; a substantial increase.

EXAMPLE 2

This example illustrates the decrease in pitch yield in crude tall oil upon fractionation. Soap skimmings with the cationic polymer additive at 0.0025% and without were acidified according to the description shown in Example 1. The crude tall oil was then fractionated as usual in a commercial tall oil refinery. The results are shown in the table.

COMPARISON OF OPERATIONS WITH AND WITHOUT ADDITIVE

| | Without | With |
|---|---|---|
| Crude acid number | 161.0 | 163.1 |
| Production: | | |
| Crude yield, percent | 50.8 | 52.5 |
| Pitch yield, percent | 20.9 | 16.2 |

The effect of cationic polymer additive on crude during heating to 550° F. showed no more loss of acid number with the additive than without the additive.

EXAMPLE 3

This example illustrates the effects of decrease in pitch yield using a cationic lignin-amine prepared with kraft pine lignin via the Mannich reaction using formaldehyde and dimethyl amine. This lignin amine had a positive charge of +45 on the SCD scale. To concentrated black liquor soap skimmings at approximately 58% solids content was added 0.0025% by weight lignin amine solids in a 0.5% solution. The mixture was acidified with 66° Baumé (95%) sulfuric acid at a 1:5 ratio of acid to soap solids. The rate of separation of the acidified crude tall oil, lignin and brine layers was observed in a 500 ml. graduate cylinder at a constant temperature of 85° C.

The settling rate was compared to settling with no additive.

| | Percent in fraction after— | | |
|---|---|---|---|
| | 15 min. | 30 min. | 45 min. |
| Without additive: | | | |
| Crude tall oil fraction | 5 | 5 | 9.5 |
| Lignin fraction | 25 | 25 | |
| With additive: | | | |
| Crude tall oil fraction | 18 | 22 | 25 |
| Lignin fraction | 19 | 14 | 10 |

The lignin treated acidified crude tall oil was then fractionated in the laboratory with no deleterious effect on the distillate.

From the foregoing experiments it is clear that treatment of black liquor soap skimming with high molecular weight water-soluble polyamides and lignin amines increases the settling rate and decreases pitch yield. Furthermore, it was noted that heating crude tall oil treated with the additive prior to fractionation does not produce harmful effect.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. The process of treating kraft black liquor soaps which consists essentially of, mixing liquor soap with from 0.001% to 0.025% by weight of a high molecular weight, water-soluble, cationic polymer having a positive charge greater than +10 on the SCD scale from the group consisting of polymers of polyamide resins, acidifying the black liquor to liberate the crude tall oil, and allowing the crude tall oil to settle.

2. The process of claim 1 wherein said polymer is mixed in an amount between 0.001% and 0.01% by weight.

3. The process of claim 1 wherein said polymer is produced from adipic acid and diethylene triamine condensed with epichlorohydrin.

4. In a process for decreasing the yield of pitch in tall oil the improvement consisting essentially of, mixing acidified kraft black liquor soap at a temperature between ambient and 100° F., with from 0.001% to 0.025% by weight of an additive from the group consisting of polymers of polyamide resin and allowing the mixture to settle.

5. The process of treating kraft black liquor soap which consists essentially of, mixing black liquor soap with from 0.001% to 0.025% by weight of a high molecular weight, water-soluble, lignin amine having a positive charge greater than +10 on the SCD scale, acidifying the black liquor to liberate the crude tall oil, and allowing the crude tall oil to settle.

6. The process of claim 5 wherein said lignin amine is mixed in an amount between 0.001% and 0.01% by weight.

7. The process of claim 5 wherein said lignin amine is the reaction product of lignin, formaldehyde and dimethyl amine.

8. In a process decreasing the yield of pitch in tall oil, the improvement consisting essentially of, mixing acidified kraft black liquor soap at a temperature between ambient and 100° F., with from 0.001% to 0.025% by weight of a high molecular weight, water-soluble lignin amine having a positive charge greater than +10 on the SCD scale, and allowing the mixture to settle.

9. The process of treating kraft black liquor soap which consists essentially of, mixing black liquor soap with from 0.001% to 0.025% by weight of a high molecular weight, water-soluble, cationic polymer having a positive charge greater than +10 on the SCD scale from the group consisting of polyacrylamide polymers, acidifying the black liquor to liberate the crude tall oil, and allowing the crude tall oil to settle.

10. The process of claim 9 wherein said polymer is mixed in an amount between 0.001% and 0.01% by weight.

11. The process of claim 9 wherein said polymer is 2-(dimethylamine) ethyl acrylate.

12. In the process for decreasing the yield of pitch in tall oil the improvement consisting essentially of, mixing acidified kraft black liquor soap at a temperature between ambient and 100° F., with from 0.001% of 0.025% by weight of an additive from the group consisting of polyacrylamide and polymers and allowing the mixture to settle.

References Cited

UNITED STATES PATENTS

| 2,201,797 | 5/1940 | Scott | 266—97.5 |
| 3,409,500 | 10/1966 | Strazdins | 162—164 |
| 2,710,856 | 6/1955 | Carpenter | 260—102 |
| 1,986,854 | 1/1935 | Reid | 260—102 |
| 3,489,740 | 1/1970 | Cholet | 260—97.7 |

MAURICE J. WELSH, Primary Examiner

W. E. PARKER, Assistant Examiner

U.S. Cl. X.R.

162—164; 260—105